Feb. 13, 1951  V. A. RAYBURN ET AL  2,541,610
CONVEYING AND WEIGHING APPARATUS
Filed Oct. 29, 1946  2 Sheets-Sheet 1
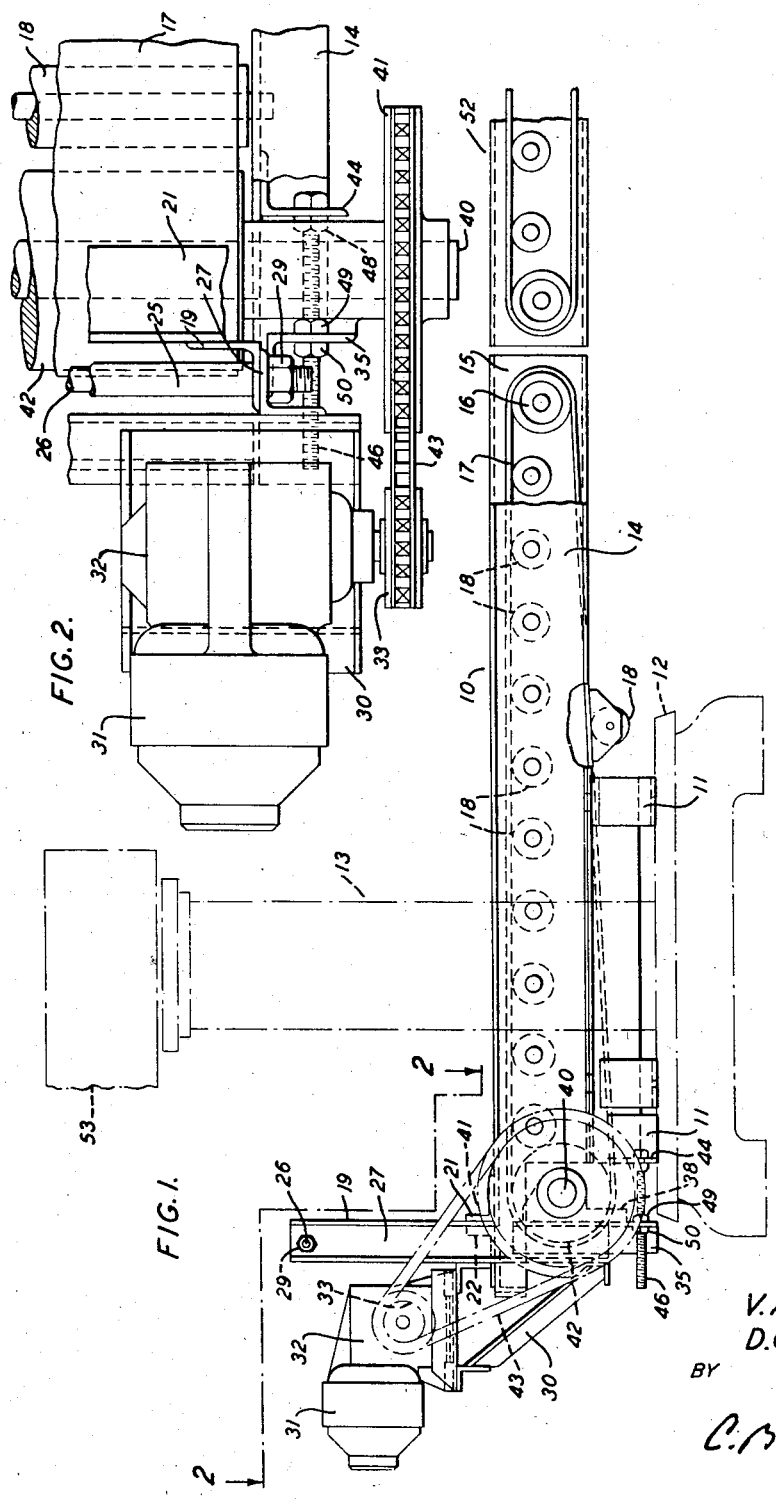
INVENTORS
V. A. RAYBURN
D. C. ROBSON
BY
C. B. Hamilton
ATTORNEY

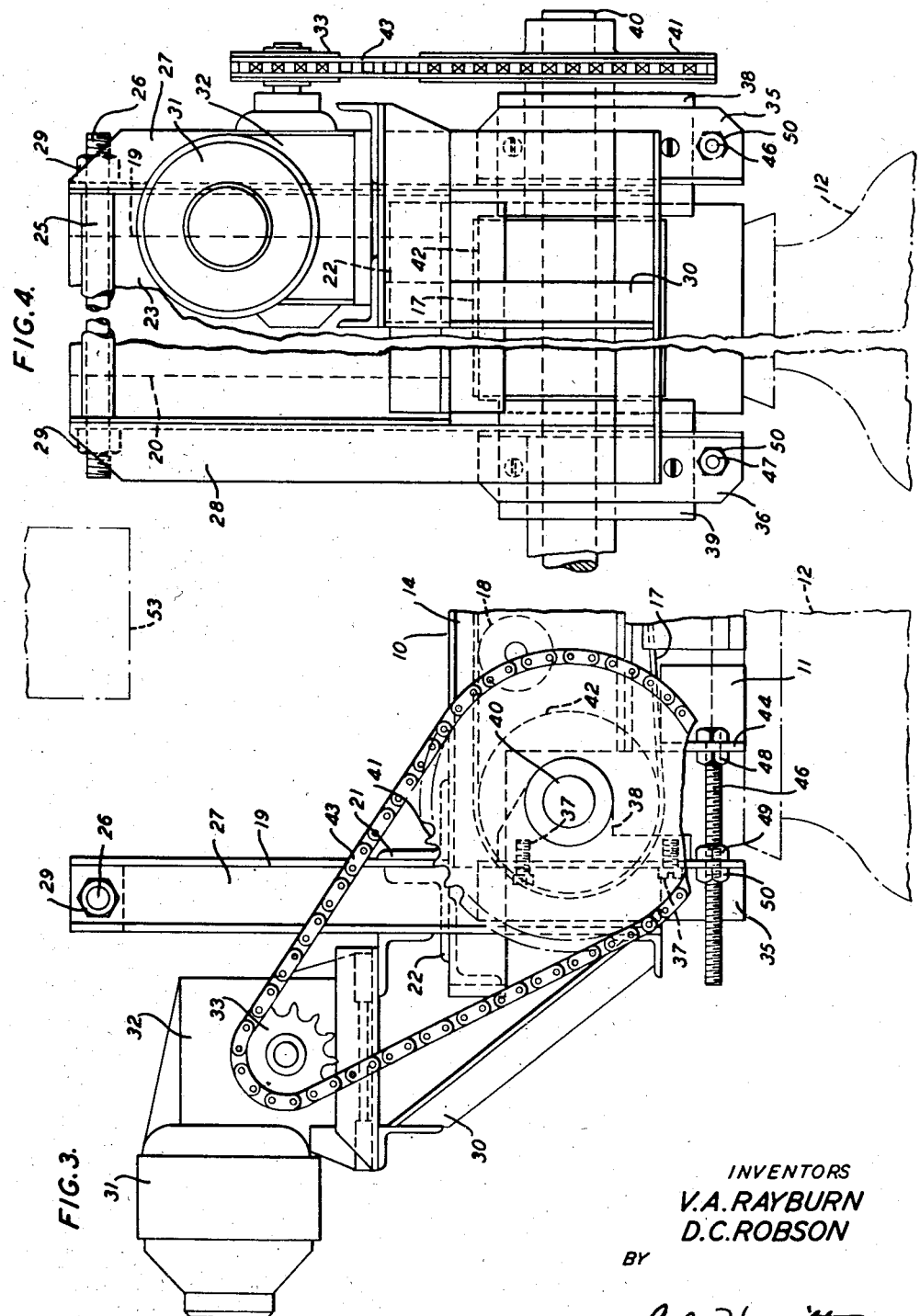

Patented Feb. 13, 1951

2,541,610

UNITED STATES PATENT OFFICE 2,541,610

CONVEYING AND WEIGHING APPARATUS

Vincent A. Rayburn and Duer C. Robson, Baltimore, Md., assignors to Western Electric Company, Incorporated, New York, N. Y., a corporation of New York Application October 29, 1946, Serial No. 706,442

9 Claims. (Cl. 198—39)

This invention pertains to conveying and weighing apparatus and more particularly to apparatus for weighing batches of material on a conveying means.

An object of the invention is the provision in a material conveying system of a weighing device having a belt conveyor and its operating motor mounted upon the weighing platform to provide quick and easy handling of the material.

Another object is to pivotally mount the conveyor motor on a frame supported by the weighing platform so that it will counterbalance the conveyor and be adjustable to control the tension of the belt of the conveyor with the least amount of labor and time.

In accordance with these and other objects one embodiment of the invention provides an apparatus for weighing batches of material and conveying them comprising a platform scale, a frame secured to the weighing platform of the scale, a belt conveyor mounted on the frame and overhanging the weighing platform, a motor drive for the conveyor pivotally mounted on the frame so as to counterbalance the overhang of the conveyor, and means for adjusting the location of the motor drive relative to the conveyor so that the tension of the conveyor belt may be varied.

In the accompanying drawings;

Fig. 1 is a side elevational view of the combined conveyor and weighing apparatus embodying the present invention;

Fig. 2 is an enlarged fragmentary plan view of the motor drive for the conveyor looking in the direction indicated by the arrows 2—2 in Fig. 1;

Fig. 3 is an enlarged fragmentary side view of the adjustable motor drive for the conveyor, and Fig. 4 is an enlarged fragmentary end view of the combined weighing and conveying apparatus.

In Fig. 1 the reference numeral 10 designates generally an endless belt conveyor which is mounted on a frame 11 secured to and supported on a weighing platform 12 of a scale 13. The conveyor 10 includes two spaced flanged steel side plates 14—15 (Figs. 1 and 4) in which are rotatably mounted an idler roller 16, over which an endless conveyor belt 17 passes, and a plurality of rollers 18 for supporting the belt 17.

Secured to the side plates 14—15 near the left end of the conveyors as viewed in Figs. 1 and 3 are two flanged uprights 19—20 (Fig. 4). These uprights are rigidly secured to the plates 14—15 by angle irons 21—22 welded thereto. A sheet metal guard 23 is welded to the uprights 19—20 and to the interconnecting angle irons 21—22 to cover the space between the uprights. A steel spacing tube 25 is positioned between the upper end of the uprights 19—20 and a movable tie rod 26 therein passes through and beyond apertures in the uprights. Positioned on the ends of the tie rod 26 are a pair of side arms 27—28 which are free to swing and pivot thereon. These arms are held on the tie rod by nuts 29 threaded on the ends thereof. Secured to the side arms 27—28 is a welded framework 30 which carries a drive motor 31 and a reduction gear unit 32.

Welded to the lower parts of the side arms 27—28 and extending downwardly therefrom are two flanged members 35—36 (Figs. 3-4) which have secured to them by machine screws 37 two bearings 38—39. A shaft 40 is rotatably mounted in these bearings and has splined thereto at one end a sprocket 41. Also secured intermediate the shaft is a head roller 42 which drives the endless conveyor belt 17. The shaft 40 and roller 42 are driven by the motor 31 through the gear reduction unit 32 connected thereto, through a sprocket 33 connected to the unit 32, through a sprocket chain 43 and the sprocket 41 splined to the shaft 40.

Integral with the frame 11 and extending from both sides at the left end thereof (Figs. 3-4) are two flanges 44 which carry individual threaded bolts 46—47. These threaded bolts are held in position in the flanges 44 by the lock nuts 48 and extend through apertures in the flanged members 35—36 which are secured to and carried by the swingable side arms 27—28.

By swinging the side arms 27—28 clockwise or counterclockwise about the tie rod pivot 26 and adjusting positioning nuts 49—50 on each side of the flanged members 35—36, the framework 30, the motor 31, the gear reduction unit 32, the sprockets 33 and 41, sprocket chain 43 and the roller 42 can be moved to the right or left as a single unitary structure to vary the tension on the conveyor belt 17 without disturbing the connection between the sprockets and the sprocket chain.

The weight of the driving mechanism and its mount is such that the overhang of the conveyor 10 at the right hand end is counterbalanced thereby. Positioned at the overhanging right hand end of the belt conveyor 10 and in alignment therewith is another endless belt conveyor 52 which is continuously driven from another source of power not shown.

Also positioned adjacent the endless belt conveyor 10 on the weighing scale 13 is a rotary shear 53 indicated by a blocked outline in Fig. 1, which is used to cut material into sheets of predetermined length, which sheets are deposited automatically in a pile on top of the belt 17 of the conveyor 10. Obviously any other material working device could be used to feed material in any desired form onto the conveyor 10.

In operating the conveyor and weighing apparatus the endless belt 17 of the conveyor 10 is tested for tightness and if the tension thereon is not great enough the nuts 49—50 are loosened on the bolts 46—47 and the side arms 27—28 along with the motor 31, the sprockets 33, 41, sprocket chain 43, and roller 42 carried thereby are shifted as a unitary structure toward the left or clockwise about the pivot rod 26 until the belt 17 is stretched to the tautness desired whereupon the nuts 49—50 are again tightened against the flanged members 35—36 to hold the driven roller 42 in its adjusted position.

The motor is then started and power is applied through the gear reduction unit 32 to operate sprocket 33 which in turn rotates the sprocket chain 43 and sprocket 41. The operation of sprocket 41 causes the shaft 40 and the belt roller 42 to rotate whereby the endless conveyor belt 17 is actuated to carry any material thereon toward the right as shown in Fig. 1 to transfer it onto the other conveyor 52.

When it is desired to deposit sheet material, such as batches of a desired weight of insulating material in sheet form onto the conveyor 10, the conveyor can be stopped or run at a very low speed. The rotary shear 53 is then actuated to cut insulated material into sheets of predetermined lengths and deposit them in a pile on the conveyor 10 mounted on the weighing scale 13. When the desired amount of material is deposited on the conveyor 10 as indicated by the weighing scale 13, the operator stops the rotary shear 53 and then starts the conveyor in operation, or speeds it up if already operated, to transport the material to the conveyor 52 which carries the batches of material to a rubber mill or a storage space.

It will be understood that changes in the details herein described and illustrated for the purpose of explaining the nature of this invention may be made by those skilled in the art without departing from the spirit and scope of the invention as defined by the appended claims. It is therefore intended that these details be not interpreted in a limited sense but as illustrative only.

What is claimed is:

1. In a conveying and weighing apparatus, a weighing means, a conveyor mounted on and overhanging the weighing means at one end, means for actuating the conveyor, a motor for driving the actuating means, means for pivotally mounting the motor on the weighing means at the other end thereof to counterbalance the overhang of the conveyor, and means for adjusting mounting for the motor about its pivot to control the tension of the conveyor.

2. Material handling apparatus comprising a weighing means, a frame mounted upon and at one end overhanging the weighing means, an idler roller mounted in the overhanging end of the frame, a driven roller movably supported in the other end of the frame, an endless belt passing around the said rollers for conveying material thereon, means for actuating the driven roller to move the endless belt, a pivot rod secured in the frame, means for pivotally mounting the actuating means upon the pivot rod in the frame, said actuating means mounted to overhang the weighing means to counterbalance the overhang effect of the frame, and means for adjustably moving the actuating means and driven roller about the said pivot rod to a fixed position to control the tension of the endless belt.

3. Material handling apparatus comprising a weighing means, a first frame mounted on and at one end overhanging the weighing means, a second frame pivotally mounted to the first frame, an idler roller mounted in an overhanging end of the frame, a driven roller, an endless belt passing over the said rollers for conveying material, actuating means for operating the driven roller to move the belt, means for mounting the actuating means and the driven roll on the second frame to counterbalance the overhang of the conveyor on the weighing means, and means for adjusting the position of the second frame to control the tension of the conveying belt.

4. In a conveying and weighing apparatus, a weighing means, a first frame mounted on and at one end overhanging the weighing means, an idler roller rotatably mounted in the overhanging portion of the frame, a pair of uprights secured to and extending above the frame, a pair of side arms pivotally mounted to and depending from the uprights, a second frame secured to the side arms and overhanging the other end of the weighing means, a driven roller rotatably mounted on the side arms and positioned within the first frame, an endless belt passing around the said rollers for conveying articles thereon, a motor for rotating said driven roller, said motor being mounted on the side arms to overhang the support to counterbalance the effect of the overhanging portion of the conveyor, and means for adjusting the side arms relative to the first frame to vary the tension of the belt and control the said balance.

5. In a conveying mechanism, a support, a frame mounted on an overhanging the support at one end, an idler roller mounted in the overhanging end of the frame, a second frame pivotally secured to the first frame, a driven roller mounted on the second frame, an endless belt passing around said rollers, driving means for the driven roller mounted on the second frame, said second frame mounted to counterbalance the effect of the overhang of said first frame, and means to vary the relative position of the second frame with respect to the first frame to adjust the tension of the belt.

6. In a conveying mechanism, a support, a frame positioned on the support so that one end overhangs the support, an idler roller mounted in the overhanging portion of the frame, a pair of side arms pivotally mounted on the other end of the frame, a driven roller supported on the side arms and positioned within the frame, an endless belt passing around said rollers, means for actuating the driven roller to move the endless belt, said actuating means mounted on the side arms to overhang the support whereby the overhanging portion of the conveyor is counterbalanced, and means to vary the position of the driven roller by pivoting the side arms and actuating means relative to the frame so that the tension of the belt is adjusted.

7. In a belt tensioning device for an endless belt conveyor, a first frame, an idler roller mounted in the frame a pair of uprights secured to and extending above the frame, a pair of side arms pivotally secured to and depending from the upper end of the uprights, a driven roller mounted on the second frame and positioned within the first frame, an endless belt passing around the rollers, actuating means for the driven roller mounted on the side arms, and means to move the side arms to a desired position relative to the first frame to adjust the tension of the endless belt.

8. In a conveying and weighing apparatus, a weighing means, a first frame mounted on and at one end overhanging the weighing means, an idler roller mounted in the overhanging portion of the frame, a pair of flanged uprights secured to and extending above the frame, a pair of side arms pivotally mounted to and depending from the upper end of the uprights, a second frame mounted on the side arms and overhanging the other end of the weighing means, a driven roller mounted on the side arms and positioned within the first frame, an endless belt passing around the rollers, a motor for actuating the driven roller positioned on the second frame in such a manner as to counteract the unbalance produced by the overhang of the first frame, a pair of flanges on the first frame, a second pair of flanges on the side arms, means secured to the first flanges and passing through the second flanges and adjustable to move the side arms to a fixed predetermined position relative to the first frame for the purpose of applying a predetermined fixed tension to the endless belt.

9. In a conveying apparatus, a support, a first frame pivotally secured to and overhanging one end of the support, said frame producing a moment about its pivot point, an idler roller mounted in the overhanging portion of the frame, a pair of uprights secured to and extending above the frame, a pair of side arms pivotally secured to and depending from the uprights, a second frame secured to the side arms and overhanging the other end of the support, means for locking the side arms in a desired position, a driven roller mounted on the side arms, an endless belt passing around the roller, actuating means for the driven roller and mounted on the second frame to balance the conveyor.

VINCENT A. RAYBURN.
DUER C. ROBSON.

REFERENCES CITED

The following references are of record in the file of this patent:

UNITED STATES PATENTS

| Number | Name | Date |
|---|---|---|
| 1,617,301 | Reddick et al. | Feb. 8, 1927 |
| 1,766,444 | Marsh | June 24, 1930 |
| 1,923,009 | Miller et al. | Aug. 15, 1933 |
| 2,202,882 | Wylie | June 4, 1940 |
| 2,257,758 | Murch | Oct. 7, 1941 |
| 2,288,099 | Mason | June 9, 1942 |
| 2,394,638 | Schroder | Feb. 12, 1946 |